US012609402B2

(12) United States Patent
    Dobusch et al.

(10) Patent No.:    US 12,609,402 B2
(45) Date of Patent:        Apr. 21, 2026

(54) DEVICE HAVING A PLURALITY OF BATTERY CELLS ARRANGED ONE BEHIND THE OTHER IN A JOINING DIRECTION

(71) Applicant: Kreisel Electric GmbH & Co. KG, Rainbach im Mühlkreis (AT)

(72) Inventors: Peter Dobusch, Grünbach (AT); Gerhard Waldschütz, Freistadt (AT); Helmut Kastler, Freistadt (AT); Kilian Menzl, Linz (AT)

(73) Assignee: John Deere Electric Powertrain LLC, Moline, IL (US)

( * ) Notice: Subject to any disclaimer, the term of this patent is extended or adjusted under 35 U.S.C. 154(b) by 716 days.

(21) Appl. No.: 17/640,903

(22) PCT Filed: Aug. 10, 2020

(86) PCT No.: PCT/AT2020/060297
    § 371 (c)(1),
    (2) Date: Mar. 7, 2022

(87) PCT Pub. No.: WO2021/042142
    PCT Pub. Date: Mar. 11, 2021

(65)            Prior Publication Data
    US 2022/0336910 A1        Oct. 20, 2022

(30)        Foreign Application Priority Data
    Sep. 5, 2019    (AT) ................................ A50775/2019

(51) Int. Cl.
    H01M 50/289        (2021.01)
    H01M 10/643        (2014.01)
                (Continued)
(52) U.S. Cl.
    CPC ....... H01M 50/291 (2021.01); H01M 10/643 (2015.04); H01M 10/6557 (2015.04);
                (Continued)

(58) Field of Classification Search
    None
    See application file for complete search history.

(56)            References Cited

U.S. PATENT DOCUMENTS 8,687,366 B2      4/2014  Eckstein et al.
9,614,263 B2 *    4/2017  Yang ................... H01M 10/659
                (Continued)

FOREIGN PATENT DOCUMENTS

CN            206992187 U        2/2018
DE      10 2007 021293 A1      11/2008
                (Continued)

OTHER PUBLICATIONS

KR 20180101668 A as cited in IDS and using machine translation as English version (Year: 2018).*
                (Continued)

*Primary Examiner* — Wyatt P McConnell
*Assistant Examiner* — Joshua P McClure
(74) *Attorney, Agent, or Firm* — Tiajoloff & Kelly LLP

(57)            ABSTRACT

A device has a plurality of battery modules (1) which are arranged one behind the other in a joining direction (F) and each have a main body (2) interspersed with a group of battery cells (3) in the joining direction (F). The electrical connection of the battery modules is decoupled from their mechanical connection, and a spacer frame (4) is provided between adjacent battery modules (1), which spacer frame (4) comprises at least one spacer (5) supported against the main bodies (2) of the battery modules (1) and openings (6) for multiple electrical contacting of the battery modules (1).

20 Claims, 4 Drawing Sheets

(51) Int. Cl.

| | |
|---|---|
| *H01M 10/6557* | (2014.01) |
| *H01M 50/213* | (2021.01) |
| *H01M 50/262* | (2021.01) |
| *H01M 50/264* | (2021.01) |
| *H01M 50/291* | (2021.01) |
| *H01M 50/503* | (2021.01) |
| *H01M 50/509* | (2021.01) |

(52) U.S. Cl.
CPC ....... *H01M 50/213* (2021.01); *H01M 50/262* (2021.01); *H01M 50/264* (2021.01); *H01M 50/289* (2021.01); *H01M 50/503* (2021.01); *H01M 50/509* (2021.01)

(56) References Cited

U.S. PATENT DOCUMENTS

| | | | |
|---|---|---|---|
| 10,115,943 | B2 | 10/2018 | Kim et al. |
| 10,483,606 | B2 | 11/2019 | Kreisel et al. |
| 10,559,791 | B2 | 2/2020 | Neuss |
| 2011/0267778 | A1 | 11/2011 | Eckstein et al. |
| 2016/0133904 | A1* | 5/2016 | Ogawa ................ H01M 50/213 |
| | | | 429/156 |

| | | | |
|---|---|---|---|
| 2017/0005377 | A1 | 1/2017 | Rong |
| 2017/0005378 | A1 | 1/2017 | Rong |
| 2017/0125755 | A1* | 5/2017 | Kim .................... H01M 10/643 |
| 2018/0034020 | A1 | 2/2018 | Neuss |
| 2018/0316074 | A1 | 11/2018 | Kreisel et al. |
| 2021/0159566 | A1 | 5/2021 | Davies |
| 2022/0216557 | A1* | 7/2022 | Herter ................. H01M 50/224 |

FOREIGN PATENT DOCUMENTS

| | | | | |
|---|---|---|---|---|
| DE | 10 2009 004543 | A1 | 7/2010 | |
| DE | 20 2015 006545 | A1 | 6/2016 | |
| DE | 10 2015 013377 | A1 | 4/2017 | |
| KR | 20180101668 | A * | 9/2018 | ............ H01M 50/24 |
| WO | WO-2016200899 | A2 * | 12/2016 | ............. B60L 50/64 |
| WO | WO-2018231964 | A1 * | 12/2018 | .......... H01M 8/0258 |
| WO | 2019/113647 | A1 | 6/2019 | |

OTHER PUBLICATIONS

English-language Abstract for CN 206992187 U, Feb. 3, 2018.
English-language Abstract for DE 10 2007 021293 A1, Nov. 13, 2008.
English-language Abstract for KR 2018 0101668 A1, Sep. 13, 2018.

* cited by examiner

DEVICE HAVING A PLURALITY OF BATTERY CELLS ARRANGED ONE BEHIND THE OTHER IN A JOINING DIRECTION

FIELD OF THE INVENTION

The invention relates to a device having a plurality of battery modules arranged one behind the other in a joining direction, each of which has a main body interspersed with a group of battery cells in the joining direction.

DESCRIPTION OF THE PRIOR ART

Devices are known from the prior art which interconnect battery modules in series. These battery modules each comprise a group of battery cells which pass through the battery modules in the joining direction, with their longitudinal axis extending in the joining direction. In DE102015013377A1, for example, the battery cells of adjacent battery modules are connected to each other both electrically and mechanically via electrically conductive contact springs arranged on a plate. However, the disadvantage of this is that when battery cells are stored in the battery module in this way, the quality of the electrical contacting is achieved at the expense of mechanical flexibility and stability.

In such an embodiment, a materially bonded connection of the battery cells to the contact spring, which is common in the prior art, leads to mechanical overdetermination of the bearing arrangement under mechanical load, since the changing relative position of the battery modules introduces forces into the battery cells via their materially bonded electrical connection to the plate via the contact spring. However, neither the battery cells nor the plate is designed in their nature to absorb such mechanical loads.

Alternatively, it is known from DE202015006545U1, for example, to use a mechanically more flexible connection instead of a materially bonded connection, such as a projection arranged on a contact plate that presses on a battery cell. However, this can cause the poles of the battery cell to move laterally relative to the projection, which deteriorates the quality of the electrical contact.

SUMMARY OF THE INVENTION

The invention is thus based on the object of connecting battery modules to each other in such a way that their electrical connection is decoupled from their mechanical connection.

The invention solves the problem posed by providing a spacer frame between adjacent battery modules, which comprises at least one spacer supported against the main bodies of the battery modules and openings for multiple electrical contacting of the battery modules. The spacer separates adjacent battery modules so that they cannot approach one another in the joining direction and a defined minimum distance is thus maintained between the battery modules, wherein the individual battery cells of the adjacent battery modules are electrically connected through the openings of the spacer frame directly or, for example, by flexible conductors or contact springs, so that the battery cells remain movable within the structure transversely to the joining direction with appropriate mounting. Particularly in the case of battery modules whose battery cells protrude at least partially from the main body, undesirable mechanical forces can act on individual battery cells without a spacer frame. In the device according to the invention, in contrast, mechanical forces occurring in the joining direction are introduced into the spacer frame and subsequently the load generated by these mechanical forces is prevented from being transferred to the battery cells and damaging them. In a preferred embodiment, only one battery cell at a time is connected to another battery cell of an adjacent battery module in order to mechanically decouple not only the battery cells of several adjacent battery modules but also the battery cells of one battery module from one another. This prevents any forces acting on one battery cell from propagating to other battery cells via a mechanical connecting element. The spacer can also be limited in one or two spatial directions transverse to the joining direction, so that it can absorb not only forces in the joining direction but also lateral forces acting transverse to the joining direction.

In order to enable a mechanically decoupled fluid connection between the battery modules when the battery modules are temperature-controlled together via a temperature-control fluid, it is proposed that the main bodies of the battery modules form a flow channel for a temperature-control fluid and that the spacer frame has a fluid channel that connects the fluid outlet of one battery module to the fluid inlet of an adjacent battery module. A common temperature control of the battery modules means that the temperature-control fluid passes directly through a group of battery modules in parallel or in series, i.e. is passed from the fluid channel of one battery module directly into the fluid channel of the adjacent battery module. The fluid channel provides a fluid-tight connection between the adjacent battery modules via the spacer frame and connects the fluid connections, i.e. fluid inlet and fluid outlet of adjacent battery modules. The fluid channel can be inserted into a fluid inlet and fluid outlet in the form of an opening in the adjacent battery modules. Particularly simple design conditions result if the fluid channel is sealed off in a fluid-tight manner from the openings of the fluid connections by means of a circumferential seal.

The fluid channel can be mechanically decoupled from the spacer frame by floating the fluid channel on the spacer frame transverse to the joining direction. In this way, forces acting on the spacer frame or the battery module transverse to the joining direction can be compensated so that the mechanical load does not impair the seal between the fluid channel and the fluid connections or even damage fluid-dynamic components. Due to the floating mounting of the fluid channel, the fluid inlet and outlet, as well as the fluid channel, remain aligned with each other even when force is applied.

A simple, low-cost design in terms of manufacturing technology can be realized by connecting the fluid channel to the spacer frame via at least one injection-molded spring. As a result of manufacturing by injection molding, the floating bearing can simply be designed as an integral part of the spacer frame and no installation of further components is necessary, thus reducing acquisition and manufacturing costs of the device. In a preferred embodiment, the spacer frame comprises a fluid channel supported by a spring tongue in an opening having a larger cross-section than the fluid channel.

The assembly of the spacer frame with the battery modules, as well as their venting during commissioning, can be simplified by providing at least two fluid connections facing the spacer frame for each battery module and that the spacer frame comprises for these fluid connections a continuous fluid channel with low flow resistance and an interrupted fluid channel or a fluid channel with higher flow resistance. The fluid connections can be either fluid inlets or fluid outlets, since an inlet or outlet is defined only by the flow direction of the temperature-control fluid. In the simplest case, the interrupted fluid channel or the fluid channel with a higher flow resistance can be closed or flow-connected only with an opening that is much smaller in relation to the cross-section of the fluid channel. A smaller opening with higher flow resistance has the advantage that the flow channel can be better vented regardless of the spatial position of the battery module and a defined flow direction is still formed. If the spacer frame is designed to be point-symmetrical or at least mirror-symmetrical in relation to the fluid channels, the desired flow direction in the adjacent battery modules can be specified by turning the spacer frame without having to provide different spacer frames.

In addition to a serial electrical interconnection of the battery cells of adjacent battery modules through the spacer frame, a parallel electrical interconnection of the battery cells of a battery module can be implemented simply and flexibly in terms of production technology by providing a parallel plate between at least one battery module and the spacer frame, which plate has recesses for individual battery cells and is used for making parallel contact with the battery cells on the casing side. This parallel plate enables parallel electrical connection of all or individual groups of battery cells of a battery module, independently of the contacting of the opposing cell poles of the battery cells of adjacent battery modules and independently of the joining process of the battery cells in the main body. A particularly low installation height can be achieved by the spacer frame having receptacles for contact tongues or contact springs of the parallel plate.

In order to improve the mechanical stability of the device according to the invention despite the proposed decoupling of the mechanical and electrical connection, it is proposed that the openings of the spacer frame form receptacles for contact devices for the serial connection of individual battery cells. These contact devices may comprise a hollow body inserted substantially without play in the receptacles of the spacer frame, in which a contact spring connecting the adjacent battery cells is mounted in such a way that relative movement of the battery cells transverse to the joining axis remains possible to a predetermined extent.

In order to enable securing several battery modules with intermediate spacer frames against tensile forces simply from the outside after joining, the main bodies of adjacent battery modules can have latching openings in which latching connectors spanning the spacer frame engage. This allows tensile forces, i.e. forces that move the battery modules apart in the joining direction, to be introduced into the latching connectors and prevent the device from being pulled apart. The latching openings are preferably located on the outside of the main bodies of the battery modules, so that the latching connectors can be inserted from the outside, even subsequently. In addition, the latching connector can secure any number of battery modules, for example by being designed as an endless strap. The latching connection also enables assembly without tools, as the latching connector only needs to be plugged in.

A particularly reliable latching connection between adjacent battery modules can be produced by the latching connectors having latching bodies which engage in the latching openings and form fixing claws directed in the pull-out direction. A fixing claw is a component which braces the latching connector in the latching opening against forces in the pull-out direction, i.e. transverse to the joining direction in relation to the device, and thus prevents the latching connection from coming loose. In a preferred embodiment, the fixing claw is a blade formed by the latching connector which braces the latching connector against the latching opening under pretension.

BRIEF DESCRIPTION OF THE INVENTION

In the drawing, the subject matter of the invention is shown by way of example, wherein.

DETAILED DESCRIPTION OF THE PREFERRED EMBODIMENTS

Figure 1:
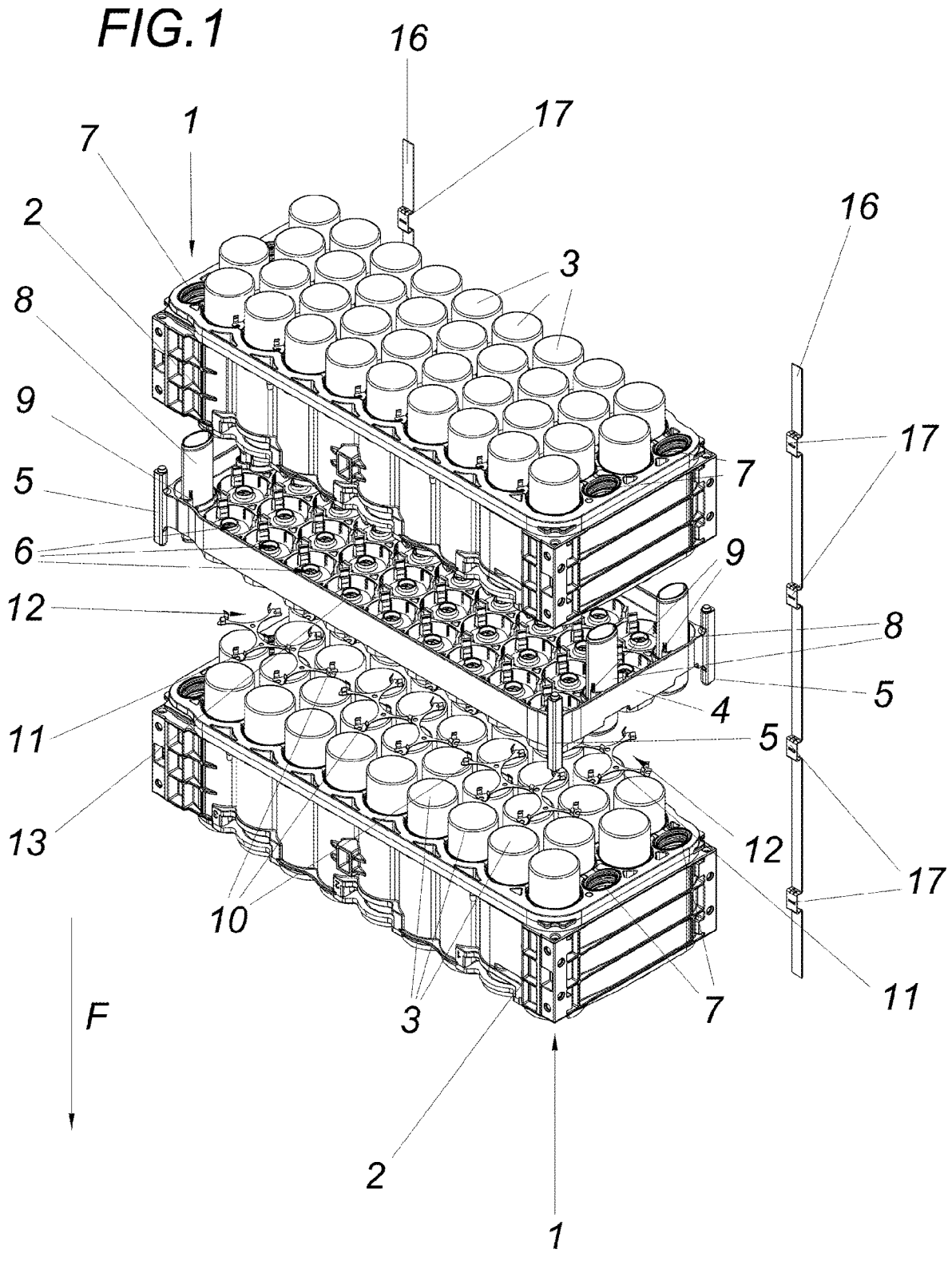
FIG. 1 shows an exploded view of a device according to the invention.
Figure 2:
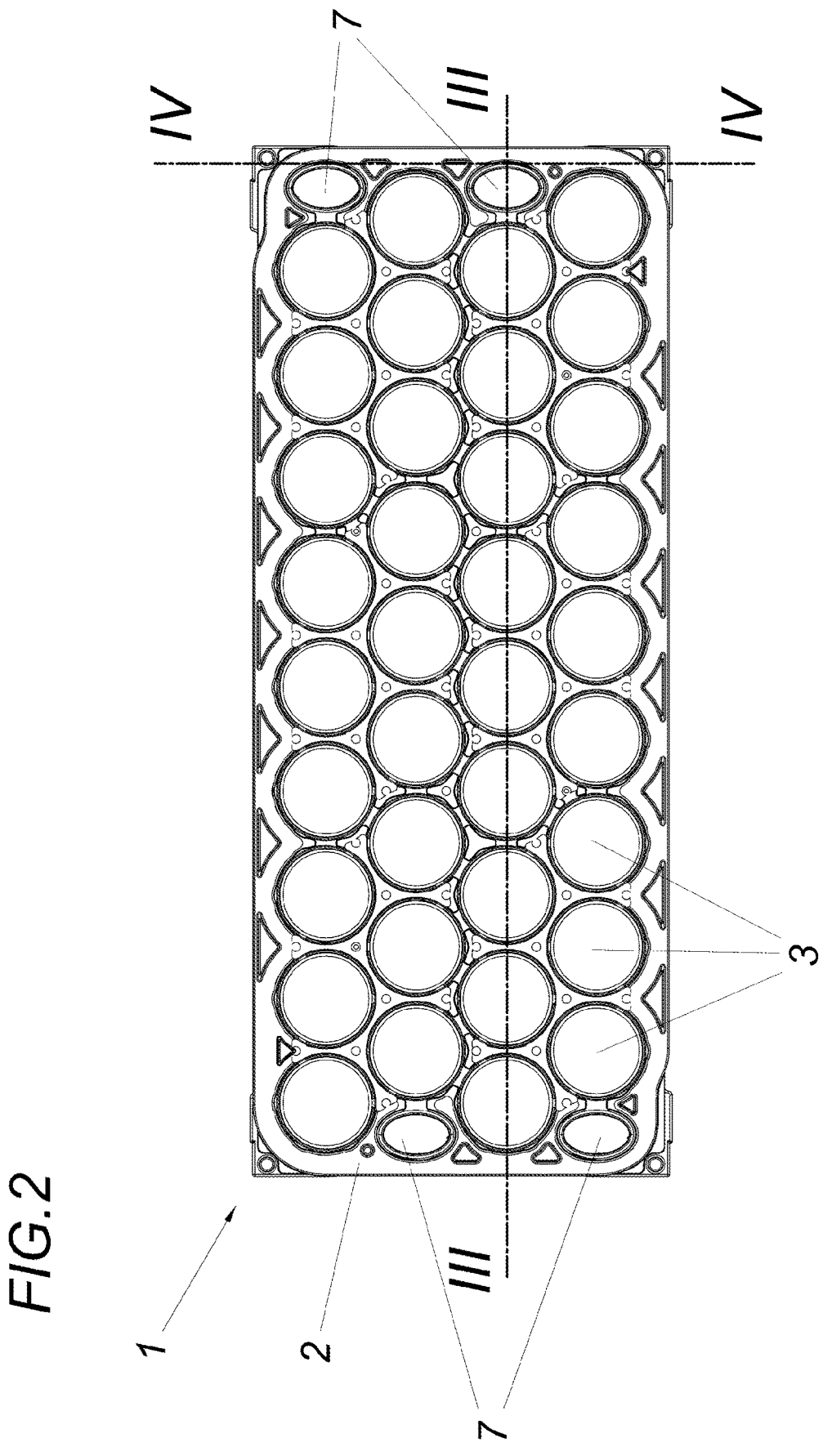
FIG. 2 shows a top view of this device.

A device according to the invention has battery modules 1 arranged one behind the other in a joining direction F with a main body 2 through which battery cells 3 pass. A spacer frame 4 is provided between adjacent battery modules 1 in joining direction F, which comprises spacers 5 and openings 6 for multiple electrical contacting of the battery cells 3.

The battery modules 1 can be fluid-cooled, with the main body 2 of the battery modules 1 forming a flow channel which is supplied with temperature-control fluid via fluid connections 7. Adjacent battery modules 1 can be connected in a fluid-tight manner via the spacer frame 4, for which purpose fluid channels 8 are provided which have high or low flow resistance depending on the flow direction of the temperature-control fluid and can be inserted into the fluid connections 7. These fluid channels 8 extend in joining direction F to both sides of the spacer frame 4.

Since thermal expansion or mechanical interference can occur during operation, the fluid channels 8 are mounted in a floating manner in the spacer frame 4. This can be implemented, for example, via an injection-molded spring tongue 9 on the spacer frame 4. In order to improve the flow conditions of the temperature-control fluid in the main body 2 of a battery module 1, two fluid connections 7 each can be provided on opposite end sections of the flow channel, wherein the spacer frame 4 also comprises two fluid channels 8 each for each end section of the flow channel and thus also of the spacer frame 4.

For parallel contacting of the battery cells 3 on the casing side, at least one parallel plate 10 can be provided on the spacer frame 4, which can be clamped to the spacer frame 4 via punched fastening holes 11 and also has recesses 12 which at least partially enclose the battery cells 3 on the casing side.

Figure 3:
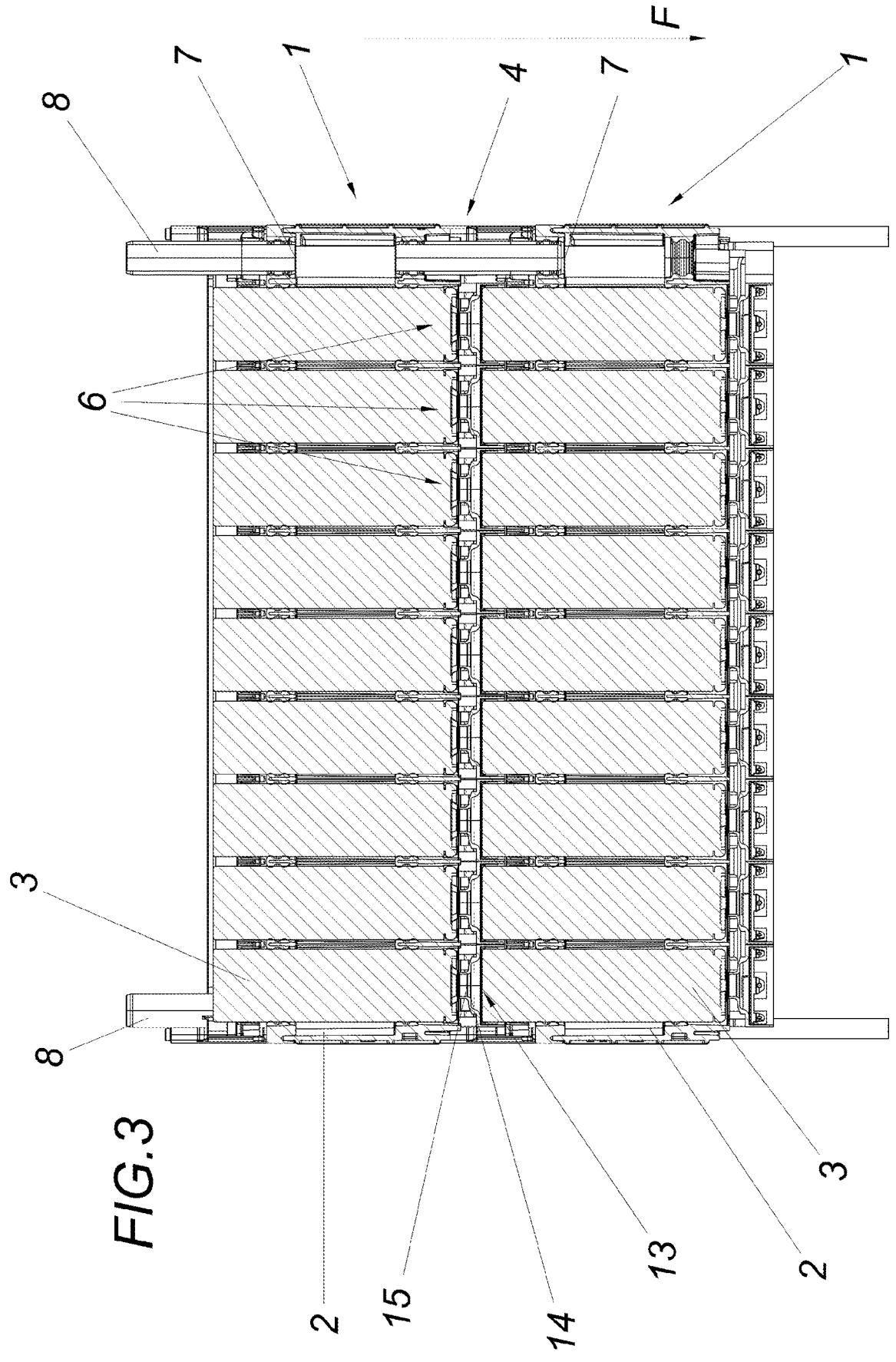
FIG. 3 shows a section along line III-III of FIG. 2 on a smaller scale.
Figure 4:
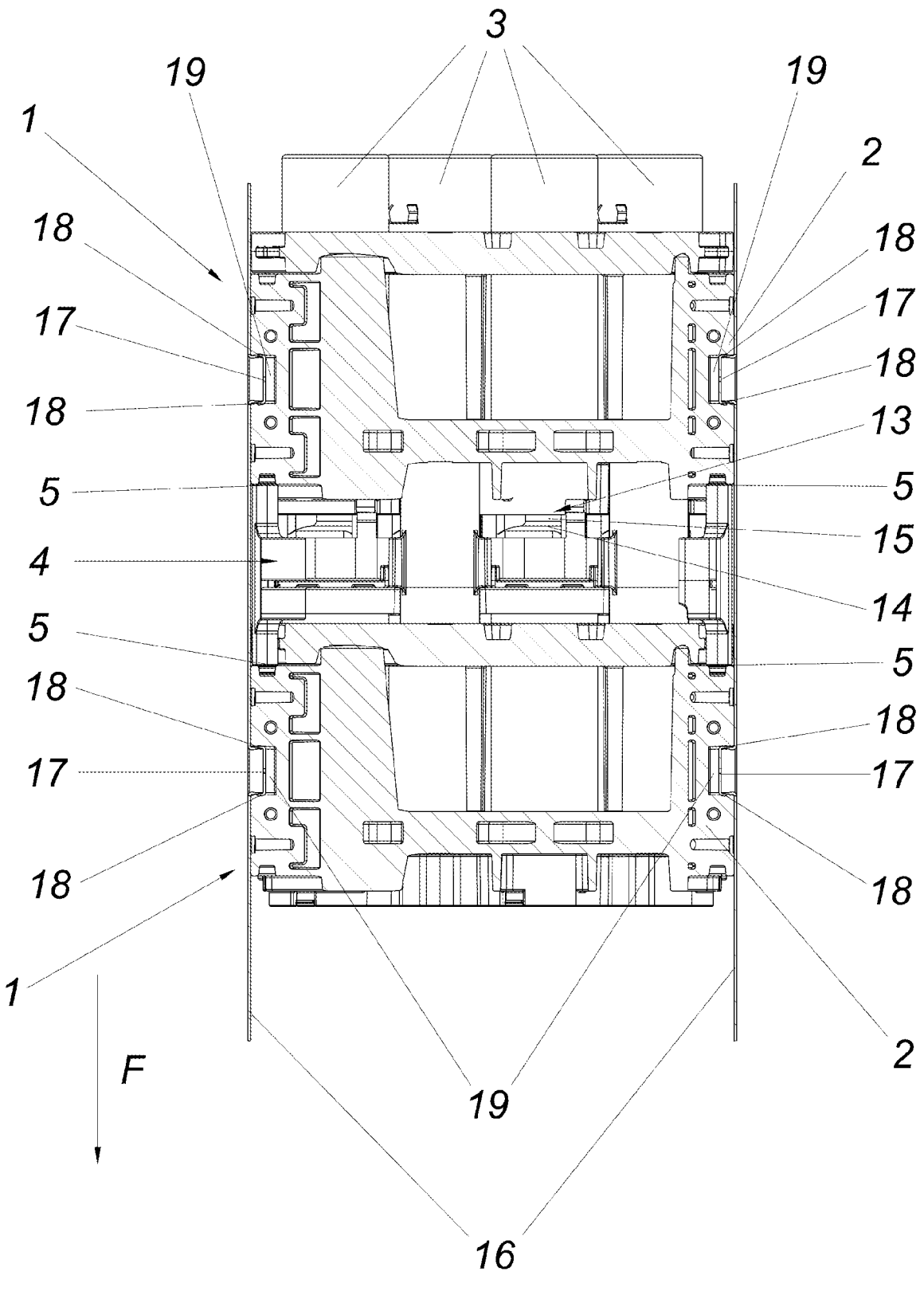
FIG. 4 shows a section along line IV-IV of FIG. 2 on a larger scale.

As can be seen in particular from FIG. 3, receptacles for contact devices 13 can be provided in the openings 6 of the spacer frame 4, which connect battery cells 3 of adjacent battery modules 1 in such a way that stable mechanical and at the same time flexible electrical contacting of the battery cells 3 can be ensured.

Such a contact device 13 can comprise a bushing 14 which is inserted in a form-fitting manner into an opening 6. A battery cell 3 is inserted into this bushing 14, which makes serial electrical contact with an adjacent battery cell 3 via a contact element 15 arranged in the joining direction on the other side of the bushing 14. The battery modules 1 can be braced together via latching connectors 16 spanning the spacer frame. These latching connectors 16 engage in latching openings 19, which are let into the main body 2 of the battery modules 1, via latching bodies 17, which have fixing claws 18 directed in the pull-out direction.

The invention claimed is:

1. A device comprising:

first and second battery modules arranged one behind the other in a joining direction;

each of said battery modules having a main body with a respective group of battery cells interspersed across the joining direction; and a spacer frame supported between the first battery module and the second battery module, wherein the spacer frame comprises at least one spacer that is supported against the main bodies of the first and second battery modules;

said spacer frame having therein openings providing multiple electrical contacting of the battery cells in the battery modules;

wherein each of the battery cells in the first battery module is serially electrically connected by a respective serial electrical connection in the joining direction through a respective one of the openings in the spacer frame to a respective battery cell of the second battery module; and wherein said serial electrical connections of each the battery cells in the first battery module to the respective battery cell of the second battery module are electrically separate from the other serial electrical connections of the other battery cells of the first and second battery modules such that the battery cells of the first battery module are serially electrically connected to only the respective battery cell of the second battery module; and the spacer maintaining the battery modules and the battery cells apart from each other in the joining direction by a distance such that a load from a mechanical force occurring in the joining direction in the one of the battery modules is transmitted through the spacer frame to the other of said battery modules and not between battery cells of the battery modules; and the openings in the spacer frame and the serial electrical connections of the battery cells being configured so that the spacer frame and the battery cells are mechanically decoupled from each other so that a force in the joining direction in any one of the battery cells is not transmitted to any of the other battery cells in the battery modules that are not aligned therewith in the joining direction.

2. The device according to claim 1, wherein the main bodies of the battery modules form a flow channel configured to receive a temperature-control fluid, and the spacer frame has a fluid channel connecting a fluid outlet of one of said battery modules to a fluid inlet of an adjacent one of said battery modules.

3. The device according to claim 2, wherein the fluid channel is mounted on the spacer frame so as to float transversely to the joining direction.

4. The device according to claim 2, wherein the fluid channel is connected to the spacer frame via at least one injection-molded spring.

5. The device according to claim 2, wherein at least two fluid connections facing the spacer frame are provided for each of said battery modules, and the spacer frame comprises a continuous fluid channel connecting the fluid.

6. The device according to claim 1, wherein a parallel plate having recesses receiving therein individual battery cells is supported between at least one of said battery modules and the spacer frame, said parallel plate contacting cylindrical sides of the battery cells in parallel.

7. The device according to claim 1, wherein the openings of the spacer frame form receptacles receiving contact devices providing the serial electrical connections connecting the battery cells in series.

8. The device according to claim 1, wherein the battery modules adjacent each other have latching openings into which latching connectors spanning the spacer frame engage.

9. The device according to claim 8, wherein the latching connectors have latching bodies engaging in the latching openings, and the latching bodies form fixing claws directed in a pull-out direction.

10. The device according to claim 3, wherein the fluid channel is connected to the spacer frame via at least one injection-molded spring.

11. The device according to claim 3, wherein at least two fluid connections facing the spacer frame are provided for each of said battery modules, and the spacer frame comprises a continuous fluid channel connecting the fluid connections.

12. The device according to claim 4, wherein at least two fluid connections facing the spacer frame are provided for each of said battery modules, and the spacer frame comprises a continuous fluid channel connecting the fluid connections.

13. The device according to claim 10, wherein at least two fluid connections facing the spacer frame are provided for each of said battery modules, and the spacer frame comprises a continuous fluid channel connecting the fluid connections.

14. The device according to claim 2, wherein a parallel plate having recesses for individual battery cells is supported between at least one of said battery modules and the spacer frame, said parallel plate contacting cylindrical sides of the battery cells in parallel.

15. The device according to claim 3, wherein a parallel plate having recesses for individual battery cells is supported between at least one of said battery modules and the spacer frame, said parallel plate contacting cylindrical sides of the battery cells in parallel.

16. The device according to claim 4, wherein a parallel plate having recesses for individual battery cells is supported between at least one of said battery modules and the spacer frame, said parallel plate contacting cylindrical sides of the battery cells in parallel.

17. The device according to claim 5, wherein a parallel plate having recesses for individual battery cells is supported between at least one of said battery modules and the spacer frame, said parallel plate contacting cylindrical sides of the battery cells in parallel.

18. The device according to claim 10, wherein a parallel plate having recesses for individual battery cells is supported between at least one of said battery modules and the spacer frame, said parallel plate contacting cylindrical sides of the battery cells in parallel.

19. The device according to claim 11, wherein a parallel plate having recesses for individual battery cells is supported between at least one of said battery modules and the spacer frame, said parallel plate contacting cylindrical sides of the battery cells in parallel.

20. The device according to claim 19, wherein the openings of the spacer frame form receptacles receiving contact devices providing the serial electrical connections connecting the battery cells in series.

* * * * *